(12) United States Patent
Bartz et al.

(10) Patent No.: US 12,699,012 B2
(45) Date of Patent: Aug. 4, 2026

(54) TURBINE ENGINE EXHAUST GAS TEMPERATURE SENSOR

(71) Applicant: Unison Industries, LLC, Jacksonville, FL (US)

(72) Inventors: Justin D. Bartz, Canandaigua, NY (US); John Patrick Parsons, Afton, NY (US); David Reece Jackson, Binghamton, NY (US); Elliott M. Hockey, Afton, NY (US)

(73) Assignee: Unison Industries, LLC, Jacksonville, FL (US)

( * ) Notice: Subject to any disclaimer, the term of this patent is extended or adjusted under 35 U.S.C. 154(b) by 667 days.

(21) Appl. No.: 18/171,531

(22) Filed: Feb. 20, 2023

(65) Prior Publication Data

US 2024/0280419 A1 Aug. 22, 2024

(51) Int. Cl.
G01K 13/024 (2021.01)
F02C 7/00 (2006.01)
G01K 1/08 (2021.01)

(52) U.S. Cl.
CPC .............. G01K 13/024 (2021.01); F02C 7/00 (2013.01); G01K 1/08 (2013.01); *F05D 2220/32* (2013.01); *F05D 2260/80* (2013.01)

(58) Field of Classification Search
CPC .......... G01K 13/024; G01K 1/08; G01K 7/02; G01K 13/02; G01K 2205/04; F02C 7/00; F05D 2220/32
USPC ....................................................... 374/144
See application file for complete search history.

(56) References Cited

U.S. PATENT DOCUMENTS

| | | | |
|---|---|---|---|
| 3,348,414 A | 10/1967 | Everett | |
| 4,978,921 A * | 12/1990 | Indig ..................... | G01N 17/02 |
| | | | 204/400 |
| 5,134,280 A * | 7/1992 | Johnston .............. | G02B 6/4202 |
| | | | 385/81 |
| 5,662,418 A * | 9/1997 | Deak ..................... | G01K 13/02 |
| | | | 374/208 |
| 6,435,017 B1 | 8/2002 | Nowicki, Jr. et al. | |
| 7,726,876 B2 | 6/2010 | Laverdiere et al. | |
| 8,247,739 B2 | 8/2012 | Schlipf | |
| 8,764,289 B2 | 7/2014 | Parsons et al. | |
| 9,188,490 B2 | 11/2015 | Perrault et al. | |
| 10,752,493 B2 | 8/2020 | Cardanobile | |

(Continued)

FOREIGN PATENT DOCUMENTS

| | | | | |
|---|---|---|---|---|
| GB | 2292832 | * 6/1995 | .............. | G01K 7/04 |
| GB | 2292832 A | 3/1996 | | |

(Continued)

*Primary Examiner* — John E Breene
(74) *Attorney, Agent, or Firm* — McGarry Bair PC

(57) ABSTRACT

A gas turbine engine can include a compressor section, combustor section, and turbine section in serial flow arrangement, with the combustor section having a combustion chamber defining an exhaust gas flow path through which combustion exhaust gas flows. An exhaust gas temperature sensor is located at least partially within the exhaust gas flow path. A housing bounds an interior, a spring located within the interior, and a temperature probe extending through the interior and thermally coupled to the exhaust gas flow path. The spring biases a probe casing of the probe against the housing.

16 Claims, 4 Drawing Sheets

(56)                        References Cited

U.S. PATENT DOCUMENTS

| | | | |
|---|---|---|---|
| 2014/0016670 A1* | 1/2014 | Greenberg | G01K 1/14 |
| | | | 374/E7.004 |
| 2014/0247106 A1* | 9/2014 | DeFrietas | G01K 1/12 |
| | | | 338/25 |
| 2021/0102593 A1 | 4/2021 | Hartl | |
| 2022/0120325 A1 | 4/2022 | Greenspan et al. | |

FOREIGN PATENT DOCUMENTS

| | | | | |
|---|---|---|---|---|
| GB | 2504284 | * | 7/2012 | G01K 1/14 |
| GB | 2504284 A | | 1/2014 | |

* cited by examiner

TURBINE ENGINE EXHAUST GAS TEMPERATURE SENSOR

TECHNICAL FIELD

The disclosure generally relates to temperature sensors, and more particularly, to exhaust gas temperature sensors in turbine engines.

BACKGROUND

Turbine engines, and particularly gas turbine engines, also known as combustion turbine engines, are rotary engines that extract energy from a flow of combusted gases passing through the engine onto a multitude of turbine blades. Gas turbine engines have been used for land and nautical locomotion and power generation, and are commonly used for aeronautical applications, such as for propulsion of aircraft.

During operation of the gas turbine engines, fuel is combusted to generate a flow of combustion exhaust gases that provide thrust and rotational energy through a set of turbines. To ensure or validate the gas turbine engine is operating as desired, a temperature sensor probe can be included in the engine wherein it is exposed to the exhaust gases. The temperature sensor can measure the temperature of the exhaust gas, and can provide a signal or measurement value to another system, such as an engine control system. The temperature sensor output can be used to, for example, protect downstream engine components from temperatures that would exceed their design capabilities.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
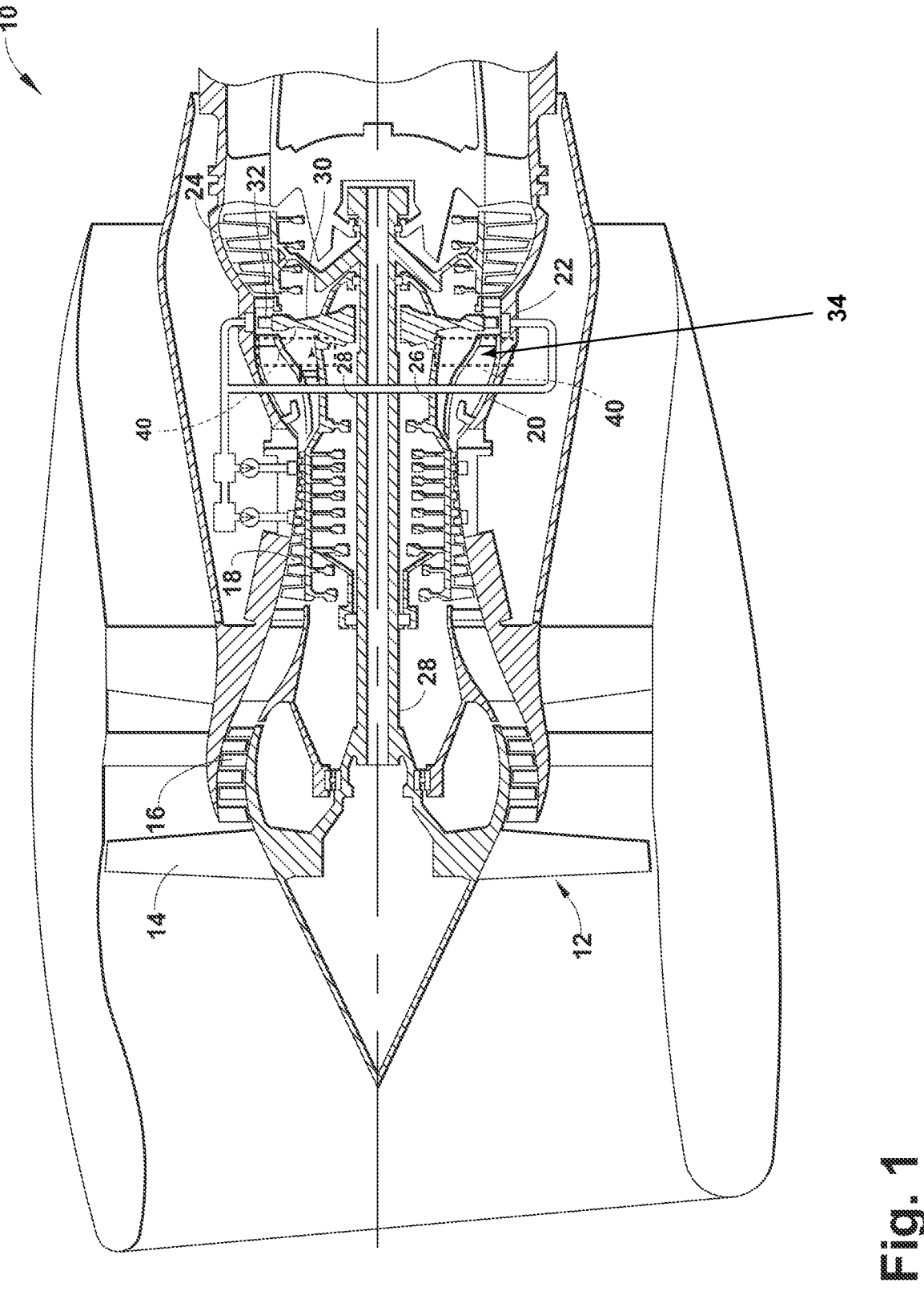
FIG. 1 is a cross-sectional view of a gas turbine engine in accordance with various aspects described herein.

The described embodiments of the present disclosure are directed to a temperature sensor and probe assembly. For purposes of illustration, one exemplary environment within which the temperature sensor can be utilized will be described in the form of a turbine engine. Such a turbine engine can be in the form of a gas turbine engine, a turboprop engine, a turboshaft engine, a turbofan engine, or an open rotor engine in non-limiting examples. It will be understood, however, that aspects of the disclosure described herein are not so limited and may have general applicability. For example, the disclosure can have applicability for a temperature sensor in other engines or vehicles, and may be used to provide benefits in industrial, commercial, and residential applications.

Exhaust gas temperature (EGT) sensors typically include a housing surrounding a thermocouple element and are configured to extend or project into a combustion gas flow for measurement of temperatures in the flow. EGT sensors immersed within the combustion gas flow, produce drag, and are exposed to strong flow and vibrational forces due to the fluid movement past the sensor housing. As a result of being immersed within the combustion gas flow, strains and stresses within the housing can be generated, and, these strains and stresses may produce creep, plastic deformation, crack initiation, and/or crack propagation within the housing of the EGT. Such fluid movements can generate component wear on the EGT sensor, which can increase maintenance time and costs, as well as affect measurement accuracy. Furthermore, such fluid movements can generate fluid vortices, shedding, turbulent flow, or other flow disturbances in the combustion gases downstream of the EGT sensor, which can negatively affect engine performance.

In addition, EGT sensors are exposed to hot combustion gases, which can be between 500° C.-2500° C. or even higher in some examples. Such sensors may be required to protect components to allow for accurate measurement of combustion gas flows while withstanding the hot environment over repeated use. Positioning the EGT sensor as close as possible to the combustor increases accuracy for combustion gas temperature measurements. However, temperatures within or directly adjacent the combustor may be higher than the sensor materials can withstand.

Aspects of the disclosure provide for an improved EGT sensor capable of operating within the turbine engine combustor environment with potentially increased component lifetimes, decreased part stresses, and/or reduced costs. Turbine engines with the improved EGT sensor described herein can have an improved engine performance and higher engine efficiency compared to engines using traditional EGT sensors.

As used herein, the term "set" or a "set" of elements can be any number of elements, including only one. Additionally, as used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, a "controller" or "controller module" can include a component configured or adapted to provide instruction, control, operation, or any form of communication for operable components to affect the operation thereof. A controller module can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), a hardware-accelerated logic controller (e.g., for encoding, decoding, transcoding, etc.), the like, or a combination thereof. Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like.

While "program code" is described, non-limiting examples
of operable or executable instruction sets can include rou-
tines, programs, objects, components, data structures, algo-
rithms, etc. that have the technical effect of performing
particular tasks or implement particular abstract data types.
In another non-limiting example, a controller module can
also include a data storage component accessible by the
processor, including memory, whether transient, volatile or
non-transient, or non-volatile memory. Additional non-lim-
iting examples of the memory can include Random Access
Memory (RAM), Read-Only Memory (ROM), flash
memory, or one or more different types of portable elec-
tronic memory, such as discs, DVDs, CD-ROMs, flash
drives, universal serial bus (USB) drives, the like, or any
suitable combination of these types of memory. In one
example, the program code can be stored within the memory
in a machine-readable format accessible by the processor.
Additionally, the memory can store various data, data types,
sensed or measured data values, inputs, generated or pro-
cessed data, or the like, accessible by the processor in
providing instruction, control, or operation to affect a func-
tional or operable outcome, as described herein.

Also, as used herein, while sensors can be described as
"sensing" or "measuring" a respective value, sensing or
measuring can include determining a value indicative of or
related to the respective value, rather than directly sensing or
measuring the value itself. The sensed or measured values
can further be provided to additional components. For
instance, the value can be provided to a controller module or
processor as defined above, and the controller module or
processor can perform processing on the value to determine
a representative value or an electrical characteristic repre-
sentative of said value. Such a provision can be via wired or
wireless communication, in non-limiting examples.

All directional references (e.g., radial, axial, upper, lower,
upward, downward, left, right, lateral, front, back, top,
bottom, above, below, vertical, horizontal, clockwise, coun-
terclockwise, fore, aft) are only used for identification
purposes to aid the reader's understanding of the disclosure,
and do not create limitations, particularly as to the position,
orientation, or use thereof. Connection references (e.g.,
attached, coupled, connected, and joined) are to be construed
broadly and can include intermediate members between a
collection of elements and relative movement between ele-
ments unless otherwise indicated. As such, connection ref-
erences do not necessarily infer those two elements are
directly connected and in fixed relation to each other. The
exemplary drawings are for purposes of illustration only and
the dimensions, positions, order and relative sizes reflected
in the drawings attached hereto can vary.

FIG. 1 is a schematic cross-sectional diagram of a turbine
engine 10 for an aircraft, which can be a gas turbine engine.
The turbine engine 10 includes, in downstream serial flow
relationship, a fan section 12 including a fan 14, a booster or
low pressure (LP) compressor 16, a high pressure (HP)
compressor 18, a combustion section 20, an HP turbine 22,
and a LP turbine 24. The combustion section 20 can define
a combustion chamber 34. An HP shaft or HP spool 26
drivingly connects the HP turbine 22 to the HP compressor
18 and a LP shaft or LP spool 28 drivingly connects the LP
turbine 24 to the LP compressor 16 and fan 14. The HP
turbine 22 includes a rotor 30 having turbine blades 32
mounted at a periphery of the rotor 30.

The turbine engine 10 can further include an exhaust gas
temperature (EGT) sensor 40, illustrated in schematic out-
line. The EGT sensor 40 is positioned within the combustion
section 20, though it is contemplated for use in any advantageous portion of the turbine engine 10. In one non-limiting
example, the EGT sensor 40 can also be positioned upstream
or downstream of the combustion section 20. In an addi-
tional non-limiting example, multiple EGT sensors 40 can
be arranged about the turbine engine 10, for instance, spaced
about a circumference of the turbine engine 10, or spaced at
different forward or aft positions.

The turbine engine 10 can operate such that the rotation
of the fan 14 draws air into the LP compressor 16. The LP
compressor 16 and the HP compressor 18 compresses the
air, and the HP compressor 18 delivers the compressed air to
the combustion section 20. In the combustion section 20, the
compressed air can be mixed with fuel, and the air/fuel
mixture is ignited, expanding and generating high tempera-
ture combustion exhaust gases. The combustion exhaust
gases flow downstream, passing the EGT sensor 40 and
through the HP and LP turbines 22, 24, generating the
mechanical force for driving the respective HP and LP
spools 26, 28. Finally, the combustion exhaust gases can be
expelled from the rear of the turbine engine 10.

Figure 2:
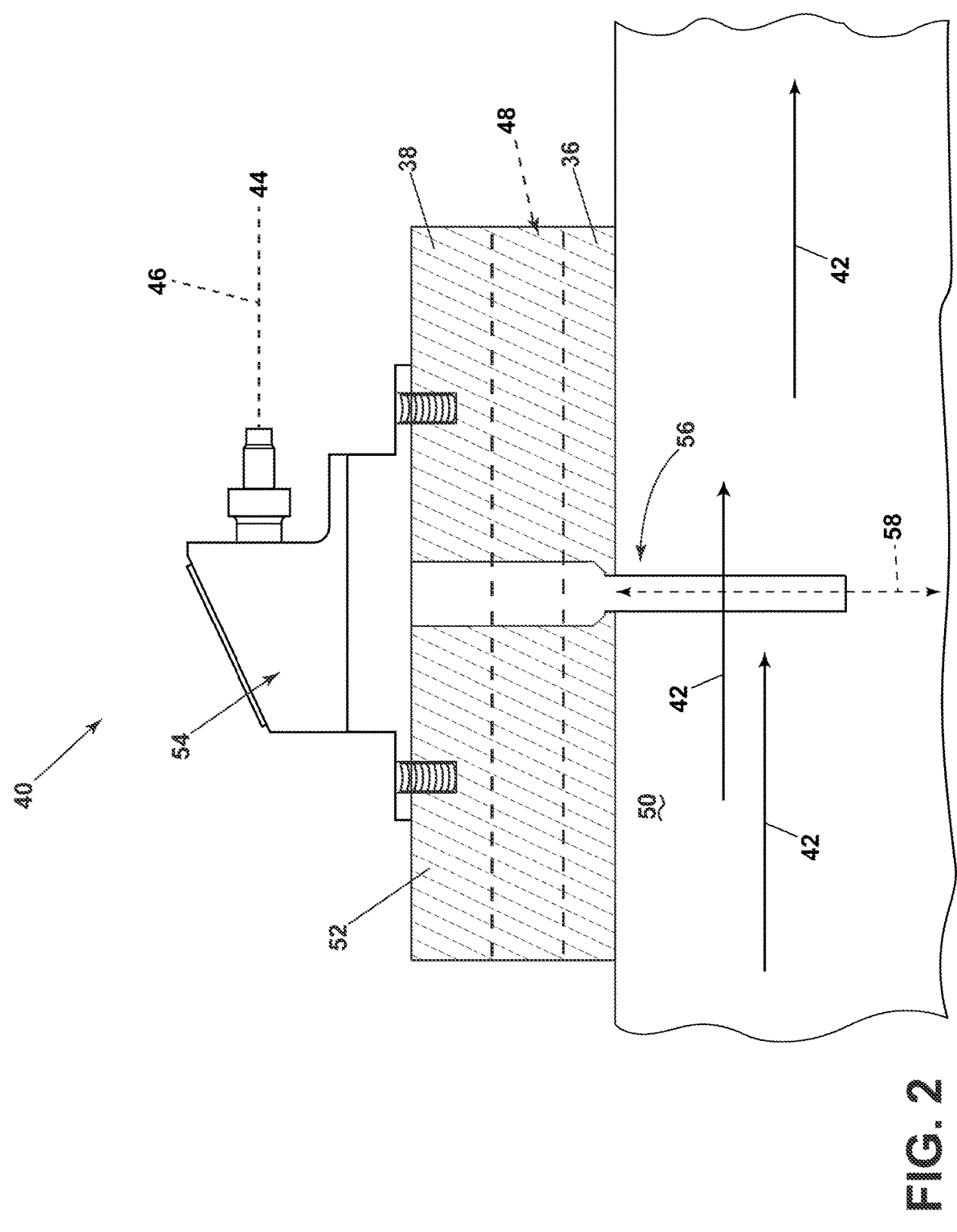
FIG. 2 is a schematic section view of a combustion section of the gas turbine engine of FIG. 1 with an exhaust gas temperature (EGT) sensor in accordance with various aspects described herein.

FIG. 2. illustrates a schematic side view of the EGT
sensor 40. In some examples, the EGT sensor 40 can be in
signal communication or communicatively coupled with
other components of the turbine engine 10, illustrated in
dashed line as being communicatively coupled to an avion-
ics system 44. The EGT sensor 40 can be in communication
with any suitable component within or external to the
turbine engine 10. In one example, a controller module 46
can be configured to receive a sensed or measured tempera-
ture, or a value representative or indicative thereof, from the
EGT sensor 40. The controller module 46 can also perform
additional or separate functionality based upon the sensed or
measured temperature. In some examples, the controller
module 46 can summate, average, or merge temperatures or
values received from or provided by multiple temperature
sensing probe assemblies, including the EGT sensor 40. In
another non-limiting example, it is contemplated that mul-
tiple EGT sensors 40 are in communication with the avionics
system 44, the controller module 46, other portions of the
turbine engine or aircraft, or one another.

An exhaust gas passage 50 can be at least partially defined
by an engine wall 52, which can be a wall within the
combustion section 20 of FIG. 1, for example. In additional
non-limiting examples, the engine wall 52 can include an
interior engine wall, an exterior engine wall, a combustor
liner, a low-pressure turbine case, a turbine case wall, or the
like. Additionally, a bleed air passage 48 can extend through
the engine wall 52, separating the engine wall 52 into an
inner casing 36 and an outer casing 38.

The EGT sensor 40 can include an upper housing portion
54 that couples to the engine wall 52 at the outer casing 38,
and an element support housing 56 that extends through the
inner casing 36 and the outer casing 38, into the combustion
exhaust gases 42. The element support housing 56 structur-
ally supports a thermocouple element such as a temperature
probe (see FIG. 3). In the non-limiting example shown, the
upper housing portion 54 can be external to the exhaust gas
passage 50, while the element support housing 56 can be
disposed within, extend into, or exposed to the exhaust gas
passage 50. The EGT sensor 40 can have any suitable
configuration including, but not limited to, at least one of the
EGT sensor 40, the upper housing portion 54, or the element
support housing 56 being supported by the engine wall 52.
In addition, while a single continuous engine wall 52 is
illustrated, the engine wall 52 can include multiple indepen-
dent or discrete walls in some non-limiting examples, with
varying or different dimensions than that shown.

The element support housing 56 can define a housing axis 58 as shown. The element support housing 56 can extend into the exhaust gas passage 50. The combustion exhaust gases 42 can flow through the exhaust gas passage 50 and encounter the element support housing 56. In other examples, any suitable fluid or gas can flow within the passage into which the element support housing 56 extends.

Figure 3:
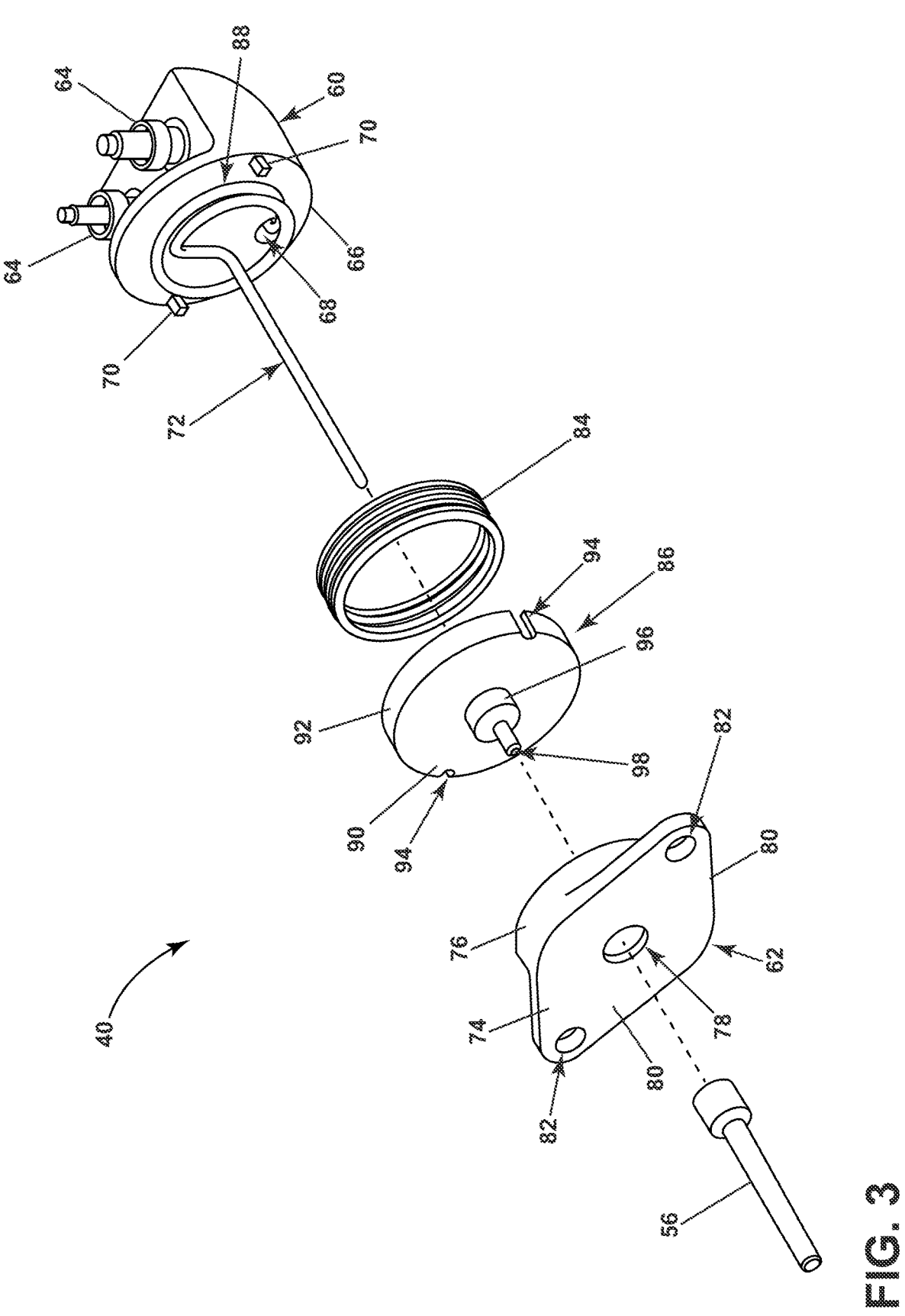
FIG. 3 is an exploded perspective view of the EGT sensor of FIG. 2 in accordance with various aspects described herein.

FIG. 3 shows the EGT sensor 40 in an exploded view, better illustrating the assembly of the EGT sensor 40. The upper housing portion 54 can be separated into an upper body 60 and a lower body 62. A pair of terminals 64 extend from the upper body 60, which can couple to the avionics system 44 or controller module 46 of FIG. 2. The pair of terminals 64 can be mounted or otherwise coupled to the upper body 60. In alternative embodiments, any number of terminals, or pairs thereof, including one, or none where another form of communication is contemplated, such as wireless communication.

The upper body 60 includes a bottom wall 66 having a braze 68 and a pair of extensions 70. A probe 72 can extend through the bottom wall 66, with the braze 68 securing the probe 72, operatively coupling to the terminals 64 within the upper body 60. The braze 68 attaches and seals the probe 72 at the bottom wall 66, sealing the interior of the upper body 60. At least a portion of the probe 72 can be coiled, or helical, defining a helical portion 88 having a diameter. The lower body 62 includes a base wall 74, with a side wall 76 extending from the base wall 74 that can be annular. The base wall 74 includes a center opening 78, along with a pair of flanges 80 extending beyond the diameter of the side wall 76. In alternate non-limiting embodiments, an off-center alignment for the center opening 78 is contemplated. A fastener opening 82 is located within each flange of the pair of flanges 80.

Figure 4:
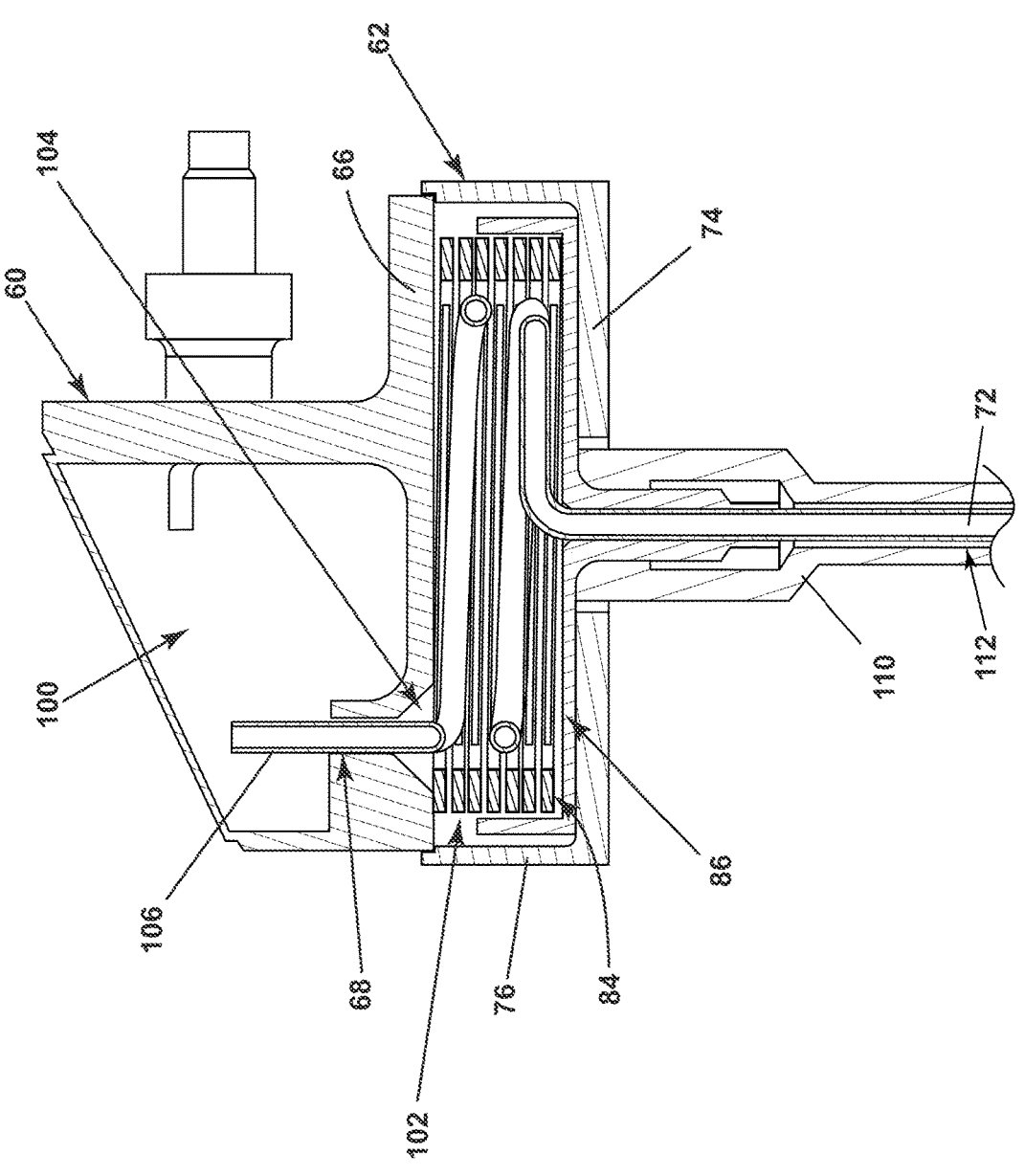
FIG. 4 is a section view of the assembled EGT sensor of FIG. 3 in accordance with various aspects described herein.

When assembled, such as that shown in FIG. 4, the lower body 62 couples to the upper body 60, encasing at least a portion of the probe 72, a biasing element 84 shown as a wave spring, and at least a portion of a plunger 86 within the side wall 76 of the lower body 62. The biasing element 84 can be coiled or helical, having a diameter that is greater than that of the helical portion 88 of the probe 72. In additional non-limiting examples, it is contemplated that the biasing element 84 can be a wave spring or Belleville-style spring, or where the biasing element 84 utilizes a non-helical biasing design. The larger diameter of the biasing element 84 permits the biasing element 84 to position about the exterior of the probe 72, while still being within the side wall 76 of the lower body 62. In alternative embodiments, it is contemplated that the biasing element 84 and the probe 72 are switched, such that the biasing element 84 has a diameter that is less than that of the helical portion 88 of the probe 72.

The plunger 86 can include a plunger base wall 90 and a plunger side wall 92 extending from the plunger base wall 90. The plunger side wall 92 can be annular, having a diameter that is greater than the biasing element 84, but lesser than the side wall 76 of the lower body 62, sized to receive or carry the biasing element 84. The plunger side wall 92 can include a pair of grooves 94, configured to align to and receive the pair of extensions 70 extending from the bottom wall 66 of the upper body 60. A plunger protrusion 96 extends from the plunger base wall 90, opposite of the plunger side wall 92, including a diameter sized to be received within the center opening 78 of the lower body 62. A probe opening 98 positions in the plunger protrusion 96, providing space for the probe 72 to extend through the probe opening 98.

Turning to FIG. 4, the upper body 60 surrounds or encases an upper interior 100, while the lower body 62 at least partially surrounds or encases a lower interior 102. The upper body 60 includes the bottom wall 66, which can commonly define the upper interior 100 and the lower interior 102. The braze 68 can include a divot 104 facing the lower interior 102. A stack 106 extends from the bottom wall 66 into the upper interior 100, and at least partially defines the braze 68. The bottom wall 66, the base wall 74 of the lower body 62, and the side wall 76 of the lower body 62 collectively define the lower interior 102. The probe 72 can at least partially extend through the stack 106 and communicatively couple to the terminals 64 (FIG. 3). The stack 106 can be crimped to physically secure the probe 72, and a sealing weld can be used to seal the braze 68 at the stack 106. In additional embodiments, it is contemplated that the EGT sensor 40 does not include a stack, or includes a stack with different geometries than that as shown in FIG. 4.

A probe casing 110 can couple to the plunger 86 at the plunger protrusion 96. The probe casing 110 houses the probe 72 which extends into the hot gas flows. In the example shown, the probe 72 is spaced from the probe casing 110 with a constant spacing distance or gap 112.

In operation, the biasing element 84 can bias the element support housing 56 against the inner casing 36 (FIG. 2). The biasing force seals the bleed air passage 48 (FIG. 2) from the combustion exhaust gases 42 (FIG. 2). When operational forces, including but not limited to vibrational, temperature, pressure, or other physical forces generated by the exhaust flow within the exhaust gas passage 50 (FIG. 2), act on the probe casing 110, those forces are mitigated by the spring force provided by the biasing element 84 biasing the plunger 86. In this way, the biasing element 84 operates to reduce stresses imparted to the probe 72 itself, thereby reducing the total stress required to be borne by the probe 72.

Traditional EGT sensors do not utilize a spring like that disclosed herein. These traditional EGT sensors require specialized manufacture, requiring the sensors to be made of multiple materials in order to provide both accurate sensor measurements, while bearing the operational stresses of the EGT environment. For example, a sensor can include a first upper material that includes increased strength or durability, while the second lower potion, that being exposed to the EGT environment, includes a different material that resists oxidation.

The aspects described herein provide for an improved EGT sensor having multiple benefits. Utilizing the biasing element 84 as described herein can reduce the total stress required to be borne by the probe 72. Therefore, a less specialized probe is required, such as the probe 72 described herein, which can be made from only a single material, without sacrificing performance. Therefore, the biasing element 84 can permit an overall decrease in system cost and complexity, despite utilizing the biasing element 84 in addition to the probe 72. In additional non-limiting embodiments, it is contemplated that two or more materials are used in the probe. In such embodiments, the reduced stresses imparted to the probe permit the use of different or less expensive materials than those currently utilized. Such materials can further include different characteristics than those typically used, as the reduction of stresses can permit the use of less durable materials otherwise not suitable for use with the EGT sensor 40. It should be appreciated that the use of bi-metallic, non-homogenous materials for the probe 72 or a sheath for the probe 72 is contemplated.

A system with decreased overall weight is further possible, where it is contemplated that the total weight of the biasing element 84 and the probe 72 is less than that of a traditional EGT sensor. More specifically, the helical nature of the probe need not be as large, wide, tall, or coiled, which can permit a reduced size for the upper housing portion 54 that houses the probe 72. Such a reduction reduces system weight, as well as overall space occupied by the EGT sensor 40. A smaller housing and a smaller sensor can be utilized, which reduces overall weight and material costs, despite utilizing the biasing element 84. Furthermore, a smaller housing and sensor provide a reduction in weight, which can provide for an increase in overall engine efficiency.

Furthermore, the assembly can improve performance for the EGT sensor, which includes robust connections, including crimps, welds, and rivets. These robust connections maintain creep resistance and margins, which reduce overall maintenance cost and time. The less specialized temperature probe further permits the use of different materials for the probe casing 110 or a probe sheath, which decrease material costs without sacrificing performance.

Further yet, the EGT sensor can simplify manufacturing. For example, the EGT sensor eliminates or reduces baking out of sealing elements, eliminating helical processing of a multi-material temperature probe, eliminates brazing requirements, reduces overall manufacture time, eliminates welds and weld macros associated with a specialized probe, as well as additional probe processing.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

A gas turbine engine comprising: a compressor section, combustor section, and turbine section in serial flow arrangement, with the combustor section having a combustion chamber defining an exhaust gas flow path through which combustion exhaust gas flows; and an exhaust gas temperature sensor comprising: a housing bounding an interior; a probe casing extending from the housing and movable relative to the housing; and a biasing element biasing the probe casing relative to the housing.

The gas turbine engine of any preceding clause wherein the exhaust gas temperature sensor further comprises a probe located within the probe casing and the interior.

The gas turbine engine of any preceding clause wherein the housing includes an upper body and separate a lower body.

The gas turbine engine of any preceding clause wherein the upper body includes a bottom wall separating the interior into an upper interior and a lower interior.

The gas turbine engine of any preceding clause wherein the bottom wall includes an opening and the temperature probe extends through the opening.

The gas turbine engine of any preceding clause wherein the opening includes a divot facing the lower interior, and a stack extending into the upper interior at least partially defining the opening.

The gas turbine engine of any preceding clause wherein probe mounts to the housing at the opening.

The gas turbine engine of any preceding clause wherein the exhaust gas temperature sensor further comprises a plunger coupled to the probe casing and carrying the biasing element.

The gas turbine engine of any preceding clause wherein the plunger includes a plunger protrusion extending through an opening in the lower body and coupling to the probe casing.

The gas turbine engine of any preceding clause wherein the plunger includes a side wall having a width sized to carry the biasing element.

The gas turbine engine of any preceding clause wherein the temperature probe is made from a single material.

The gas turbine engine of any preceding clause, further comprising: a plunger coupled to the probe casing and carrying the biasing element, and wherein the housing includes an upper body and a lower body separate from the upper body, the upper body includes a bottom wall separating the interior into an upper interior and a lower interior, and wherein the biasing member is positioned within the lower interior and engages and extends between the bottom wall and a plunger base wall of the plunger so as to bias the probe casing against the housing.

The gas turbine engine of any preceding clause wherein the helical portion of the probe is a single turn helix.

The gas turbine engine of any preceding clause wherein the probe is formed of a single material and the helical portion of the probe is a single turn helix.

An exhaust gas temperature sensor for determining a temperature in an exhaust gas flow path, the exhaust gas temperature sensor comprising: a housing bounding an interior; a probe casing extending from the housing and movable relative to the housing; and a biasing element biasing the probe casing relative to the housing.

The exhaust gas temperature sensor of any preceding clause wherein the probe includes a helical portion located within the spring.

The exhaust gas temperature sensor of any preceding clause further comprising a plunger located within the interior.

The exhaust gas temperature sensor of any preceding clause wherein the housing includes an upper body and separate a lower body, and wherein the upper body includes a bottom wall separating the interior into an upper interior and a lower interior.

The exhaust gas temperature sensor of any preceding clause wherein the bottom wall includes an opening and the probe extends through the opening.

The exhaust gas temperature sensor of any preceding clause wherein the temperature probe is made from a single material.

An exhaust gas temperature sensor for measuring an exhaust gas flow path, the exhaust gas temperature sensor comprising: a housing bounding an interior; a biasing element located within the interior; and a temperature probe located at least partially within the interior and including a helical portion located within the biasing element.

The exhaust gas temperature sensor of any preceding clause further comprising a plunger at least partially located within the interior.

The exhaust gas temperature sensor of any preceding clause wherein the plunger includes a side wall sized to carry the biasing element.

What is claimed is:

1. A gas turbine engine comprising:
a compressor section, combustor section, and turbine section in serial flow arrangement, with the combustor section having a combustion chamber defining an exhaust gas flow path through which combustion exhaust gas flows; and
an exhaust gas temperature sensor comprising:
a housing bounding an interior and having a center opening;
a probe casing extending from the housing and movable relative to the housing;
a plunger coupled to the probe casing, the plunger at least partially provided within the interior and extending through the center opening; and
a biasing element biasing the probe casing and the plunger relative to the housing.

2. The gas turbine engine of claim 1, wherein the exhaust gas temperature sensor further comprises a probe located within the probe casing and the interior.

3. The gas turbine engine of claim 2, wherein the probe is made from a single material.

4. The gas turbine engine of claim 2, wherein the housing includes an upper body and a lower body separate from the upper body.

5. The gas turbine engine of claim 4, wherein the upper body includes a bottom wall separating the interior into an upper interior and a lower interior.

6. The gas turbine engine of claim 5, wherein the bottom wall includes a braze and the probe couples to the braze.

7. The gas turbine engine of claim 6, wherein the braze includes a divot facing the lower interior, and a stack extending into the upper interior at least partially defining the braze.

8. The gas turbine engine of claim 1, wherein the biasing element positions on the plunger.

9. The gas turbine engine of claim 8, wherein the plunger includes a plunger protrusion extending through the opening in the housing and coupling the plunger to the probe casing.

10. The gas turbine engine of claim 9, wherein the plunger includes a side wall having a diameter larger than the biasing element.

11. An exhaust gas temperature sensor for determining a temperature in an exhaust gas flow path, the exhaust gas temperature sensor comprising:
a housing bounding an interior and having a center opening;
a probe casing extending from the housing and movable relative to the housing;
a plunger coupled to the probe casing and extending through the center opening;
a probe located at least partially within the probe casing and the plunger; and
a biasing element biasing the probe casing and the plunger relative to the housing.

12. The exhaust gas temperature sensor of claim 11, wherein the probe includes a helical portion located within the biasing element.

13. The exhaust gas temperature sensor of claim 11, wherein the plunger located at least partially within the interior.

14. The exhaust gas temperature sensor of claim 11, wherein the housing includes an upper body and separate a lower body, and wherein the upper body includes a bottom wall separating the interior into an upper interior and a lower interior.

15. The exhaust gas temperature sensor of claim 14, wherein the bottom wall includes a braze and the probe couples to the braze.

16. The exhaust gas temperature sensor of claim 11, wherein the probe is made from a single material.

* * * * *